(12) United States Patent
Horlacher et al.

(10) Patent No.: US 8,769,462 B2
(45) Date of Patent: Jul. 1, 2014

(54) PARASITIC EXTRACTION FOR SEMICONDUCTORS

(71) Applicant: Synopsys, Inc., Mountain View, CA (US)

(72) Inventors: Matthias Horlacher, Mountain View, CA (US); Koohak Kim, Saratoga, CA (US); William Patrick Pinello, Scottsdale, AZ (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/646,612

(22) Filed: Oct. 5, 2012

(65) Prior Publication Data

US 2013/0091480 A1   Apr. 11, 2013

Related U.S. Application Data

(60) Provisional application No. 61/544,311, filed on Oct. 7, 2011.

(51) Int. Cl.
*G06F 17/50* (2006.01)

(52) U.S. Cl.
CPC ........ *G06F 17/5081* (2013.01); *G06F 17/5031* (2013.01)
USPC ............ 716/115; 716/106; 716/108; 716/136

(58) Field of Classification Search
None
See application file for complete search history.

(56) References Cited

U.S. PATENT DOCUMENTS

| | | | |
|---|---|---|---|
| 6,145,117 A * | 11/2000 | Eng ............................... | 716/105 |
| 6,728,942 B2 * | 4/2004 | Lampaert et al. ............. | 716/102 |
| 7,143,021 B1 * | 11/2006 | McGaughy et al. ............ | 703/14 |
| 7,581,201 B2 * | 8/2009 | Kazda et al. ................... | 716/113 |
| 7,587,691 B2 | 9/2009 | Sutjahjo et al. | |
| 7,730,437 B1 * | 6/2010 | Ramakrishnan et al. ..... | 716/113 |
| 7,865,850 B1 | 1/2011 | Kao et al. | |
| 7,865,851 B2 | 1/2011 | Gurney | |
| 7,882,471 B1 * | 2/2011 | Kariat et al. ................... | 716/113 |
| 7,908,573 B2 | 3/2011 | Lin | |
| 7,941,774 B2 | 5/2011 | Luan et al. | |
| 8,099,693 B2 * | 1/2012 | Pedenon et al. ............... | 716/103 |
| 8,219,944 B2 * | 7/2012 | Song et al. ..................... | 716/103 |
| 8,302,049 B2 * | 10/2012 | Musante et al. ................ | 716/108 |
| 8,365,113 B1 * | 1/2013 | Bhardwaj et al. ............. | 716/106 |
| 8,612,918 B2 * | 12/2013 | Widiger et al. ................ | 716/132 |
| 2009/0276746 A1 | 11/2009 | Nagai | |
| 2009/0319960 A1 | 12/2009 | Lin | |
| 2010/0031209 A1 | 2/2010 | Luan et al. | |
| 2011/0168995 A1 | 7/2011 | Doong et al. | |

OTHER PUBLICATIONS

Jagadeesan J., "CMP Aware RC Extraction", Cadence, Inc., Cadence India eNewsletter, Nov. 2007, pp. 1-5.
Goffe, R., et al. "Extraction of tiled top-down irregular pyramids from large images", 13th International Workshop on Combinatorial Image Analysis (IWCIA'09), Research Publishing Services, pp. 123-137, Singapore, Nov. 2009.

* cited by examiner

*Primary Examiner* — Leigh Garbowski
(74) *Attorney, Agent, or Firm* — Adams Intellex, PLC

(57) ABSTRACT

Parasitic extraction is a useful tool for analyzing and improving timing and other characteristics of semiconductor chips. Parasitic resistance and capacitance values are determined and stored in arrays. The parasitic values are extracted for multiple corners with a single analysis of the layout. Multi-corner analysis is performed using the parasitic values thereby optimizing the timing across various temperature and process operating points.

35 Claims, 6 Drawing Sheets

510 → $R = [R_1 \ R_2 \ R_3 \ R_4 \ R_5 \ \ldots \ R_N]$

520 → $C = [C_1 \ C_2 \ C_3 \ \ldots \ C_M]$

530 → $R_1 = \begin{bmatrix} R_{T1,P1} & R_{T1,P2} \\ R_{T2,P1} & R_{T2,P2} \\ R_{T3,P1} & R_{T3,P2} \end{bmatrix}$ 540 → $C_1 = \begin{bmatrix} C_{P1} & C_{P2} \end{bmatrix}$

*FIG. 5*

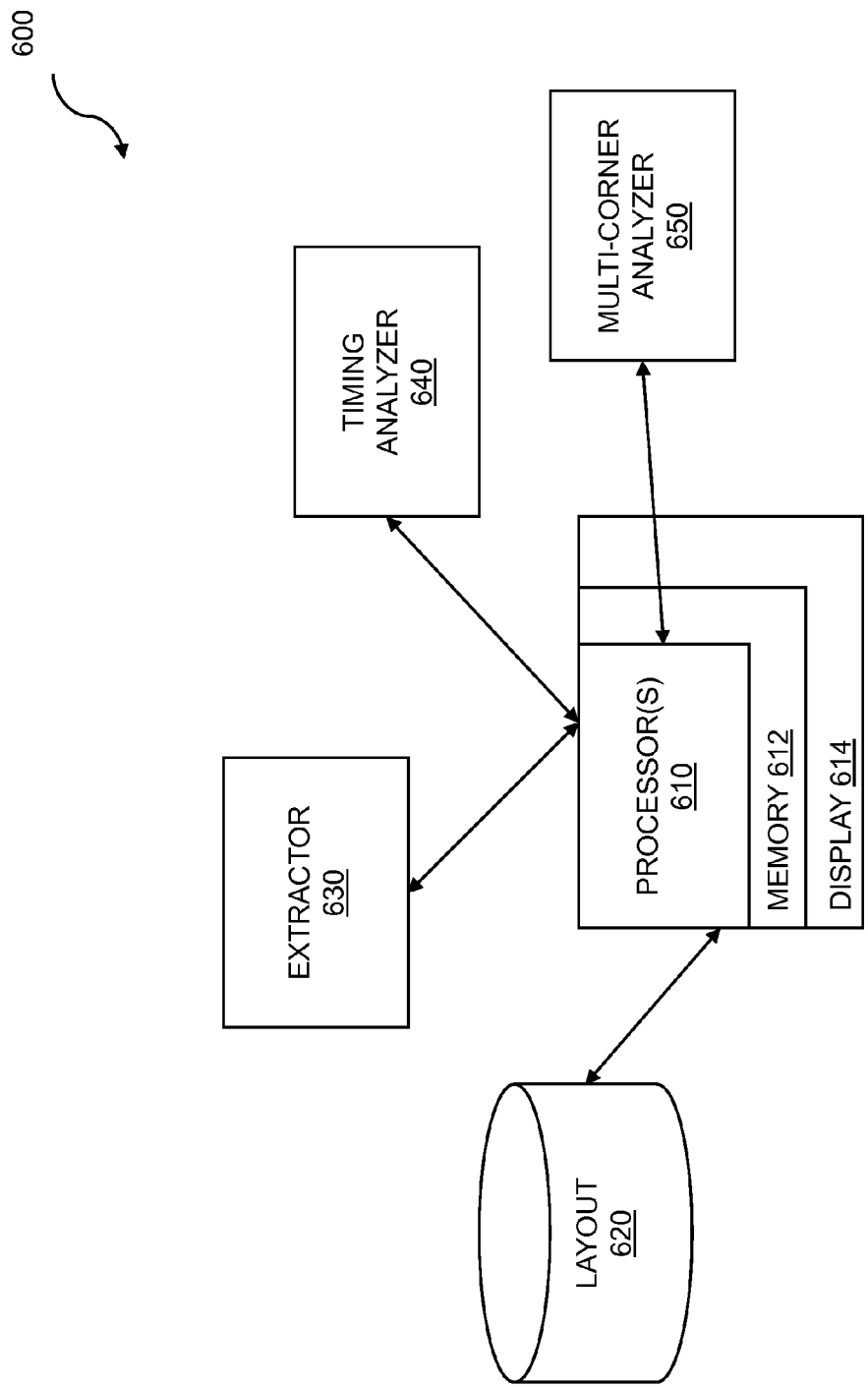

PARASITIC EXTRACTION FOR SEMICONDUCTORS

RELATED APPLICATIONS

This application claims the benefit of U.S. provisional patent application "Parasitic Extraction for Semiconductors" Ser. No. 61/544,311, filed Oct. 7, 2011. The foregoing application is hereby incorporated by reference in its entirety.

FIELD OF ART

This application relates generally to semiconductor analysis and more particularly to extraction of parasitics for semiconductors.

BACKGROUND

Integrated circuit design and fabrication is a vastly complex effort involving interaction among numerous interconnected conducting layers. A thorough understanding of the limitations of the various conducting layers is required for proper use of the fabrication process. The conducting shapes, or wires, must be designed so that the desired electronic circuit function is implemented at the resulting end of chip manufacture. Frequently, millions and even hundreds of millions of transistors can exist on a single semiconductor chip. Each transistor must be connected to other transistors so that the desired circuit operation results. The ability to design chips with such large numbers of essential transistors and wires is certainly problematic. Optimization of such circuitry can be a daunting task even with the help of electronic design automation (EDA) software tools.

There are numerous metal lines, polysilicon shapes, and diffusions in close proximity to one another on each semiconductor chip, all of miniscule dimension, which must be fabricated to exacting tolerances. As technologies advance, smaller and smaller dimensions are used in lithography. All of these semiconductor layers must be designed and fabricated to exacting tolerances. These tight tolerances mean that wherever conducting materials are separated by an insulator or are located near other structures on an integrated circuit, a capacitance results. Further, because of the miniscule dimensions of the conductors, resistance is introduced, inhibiting signals passing along the conductors. These capacitances and resistances are considered parasitics, and vary widely with operation depending on the underlying integrated circuit (IC) process, temperature, and voltage variations. Thus, in order for the resulting electronic circuit to function correctly, it is critical to understand the nature of these capacitances and resistances by extracting their values from the physical layout of the IC. After their values have been extracted, EDA tools may then be used to verify proper circuit operation for the various operating corners.

SUMMARY

Parasitic extraction involves analyzing dimensions on a semiconductor chip as well as the conditions encountered by circuitry on the semiconductor chip. A computer implemented method for performing extraction is disclosed comprising: importing a layout for a semiconductor circuit; extracting parasitics for the layout for multiple corners wherein the extracting is performed with a single pass of analyzing the layout; storing the parasitics for the layout in an array; and performing multi-corner analysis using the parasitics stored in the array. The single pass may comprise measuring lengths, widths, and spacings for geometric shapes within the layout once. The method may further comprise identifying a set of unique process and temperature combinations for the multi-corner analysis. The extracting parasitics may be accomplished for the set of unique process and temperature combinations. The parasitics which are extracted may include resistance values wherein the resistance values are a function of the process and temperature. The parasitics which are extracted may include capacitance values wherein the capacitance values are a function of the process. The parasitics which are extracted may include resistance values and capacitance values. The multiple corners may include two or more process, temperature, or voltage corners. Values for the parasitics for the multiple corners for a single component may comprise a single element within the array. The single element may be comprised of an element array. The element array may have a dimension based on a number of corners for which the multi-corner analysis is performed. The dimension may be based on a number of process corners. The dimension may be based on a number of temperature corners. The element array may be of a different dimension for a resistor element versus a capacitor element. The extracting may be performed by gathering geometric widths, lengths, and spacings within the layout. The extracting may further comprise performing a table lookup for parasitic values based on the geometric widths, lengths, and spacings. The table lookup may be repeated for each corner of interest from the multiple corners.

In embodiments, the method may further comprise performing incremental extraction by analyzing the layout to identify updates to the layout; evaluating changes to lengths, widths, and spacings within the layout; performing table look ups of resistance values and capacitance values based on the lengths, widths, and spacings which were changed; identifying a location in the array which corresponds to one of the updates to the layout; and storing updated parasitic values for one of the resistance values and the capacitance values in the array at the location which corresponds to one of the updates in the layout. The multi-corner analysis may be performed on multiple processors. The method of claim 1 may further comprise performing timing analysis during the multi-corner analysis. The method may further comprise performing timing closure using the timing analysis which was performed. The extracting may include scan line analysis. The scan line analysis may be used to calculate coupling between nets. The extracting may includes tile-based analysis. The extracting may include analysis for one or more of via etch and double etch tables. The method may further comprise generating a schematic for a portion of the parasitics which were extracted. The method may further comprise analyzing physical location for the parasitics on a semiconductor chip. The method may further comprise incorporating the parasitics which were extracted within a netlist for a semiconductor chip. The netlist may be a hierarchical netlist. The netlist may be a flat netlist. The semiconductor circuit may comprise a semiconductor chip.

In embodiments, a computer program product embodied in a non-transitory computer readable medium for performing extraction may comprise: code for importing a layout for a semiconductor circuit; code for extracting parasitics for the layout for multiple corners wherein the extracting is performed with a single pass of analyzing the layout; code for storing the parasitics for the layout in an array; and code for performing multi-corner analysis using the parasitics stored in the array. In some embodiments, a computer system for performing extraction may comprise: a memory for storing instructions; one or more processors attached to the memory wherein the one or more processors are configured to: import a layout for a semiconductor circuit; extract parasitics for the layout for multiple corners wherein the extracting is performed with a single pass of analyzing the layout; store the parasitics for the layout in an array; and perform multi-corner analysis using the parasitics stored in the array.

Various features, aspects, and advantages of numerous embodiments will become more apparent from the following description.

BRIEF DESCRIPTION OF THE DRAWINGS

The following detailed description of certain embodiments may be understood by reference to the following figures wherein:

FIG. 5 shows example parasitic capacitance and resistance arrays.
FIG. 6 is a system diagram for parasitic extraction.

DETAILED DESCRIPTION

The present disclosure provides a description of various methods, systems, and apparatus associated with extraction of parasitics for semiconductors. A semiconductor circuit layout can be analyzed to determine lengths, widths, and spacings for the various shapes that comprise the layout. The shapes form transistors, wires, vias, insulators, and the like. Parasitic resistance and capacitance are a function of the various dimensions as well as the conditions encountered by the circuitry. Resistance is a function of the shapes that make up a conductor as well as the resistivity of the conducting layers. A wider wire will have a lower resistance while a longer wire will have a higher resistance. Resistivity is a function of the thickness of the conductor. As temperature increases so does resistivity. Capacitance is a function of the shape of two conductors and the thickness and material of the insulator between the conductors. The material of the insulator has a dielectric constant where capacitance is primarily not a function of temperature and, for all practical purposes, is only a function of process.

Parasitic extraction has historically been performed for each of the corners of interest where a corner could be described by a process, a temperature, and a voltage. An improvement to the extraction process is disclosed where extraction only needs to be performed for the unique combination of process and temperature corners. By taking into account these unique combinations of process and temperature, the complexity of parasitic extraction can be significantly reduced. Performing extraction only at the unique combination of process and temperature corners allows layout analysis with a single pass through the layout to capture the needed dimensions as opposed to repeated analysis and capture of the same dimensions.

Once extraction is performed the parasitic values are stored in an array for future reference during timing analysis. Given the disclosed concept, the number of parasitic values that needs to be stored is radically reduced; therefore the array size and required storage are much smaller.

Figure 1:
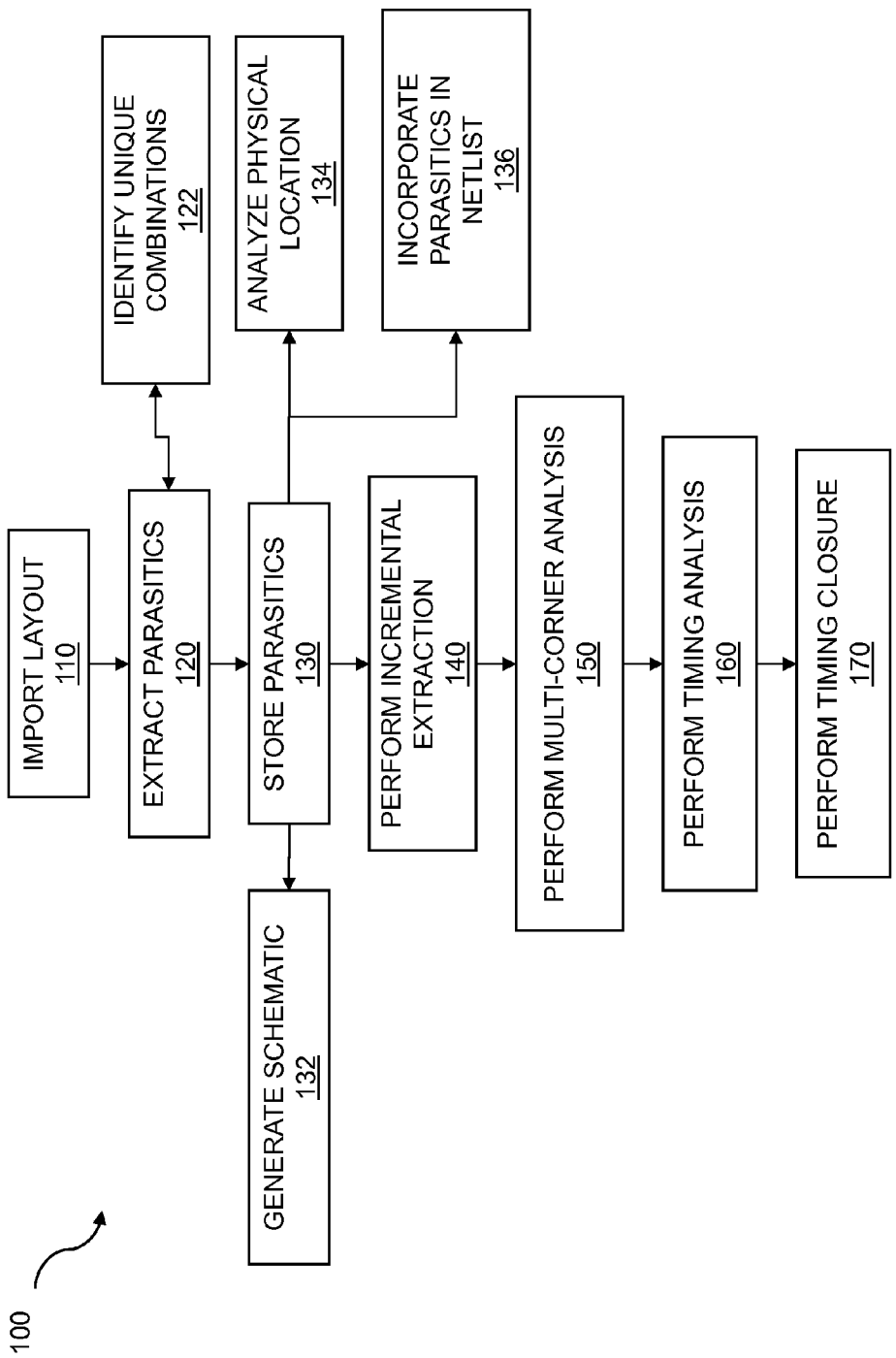
FIG. 1 is a flow diagram for using extracted parasitics.

FIG. 1 is a flow diagram for using extracted parasitics. The flow 100 describes a computer implemented method for performing extraction. The flow 100 begins with importing a layout 110 for a semiconductor circuit. The semiconductor circuit may comprise a semiconductor chip or a portion thereof. The layout may be in the form of GDSII or OASIS™ or some other format for describing various shapes, sizes, and relationships of elements in a semiconductor layout. The layout may be for a semiconductor chip or die or portion thereof. The layout may be imported into a database to be included with other information about the chip. All chip layers may be imported, a subset of the chip layers, or only a single layer. In some embodiments, the layout may already reside within a software tool and importing may be construed as using a layout already present in the tool. The flow 100 continues with extracting parasitics 120 for the layout for multiple corners wherein the extracting is performed with a single pass of analyzing the layout. The parasitics which are extracted may include resistance values and capacitance values. A resistance value for a given wire may be based on the length, width, and height of the wire. The length and width may be defined by the layout design shapes. After the fabrication process the length and width may be different from the layout design shape due to shortening, narrowing, necking, and other variations that occur during semiconductor processing. Optical proximity correction (OPC) may be used to compensate for some of these changes that occur during fabrication. Resistance may be determined for various metal levels including M0, M1, M2, M3, M4, M5, M6, and other levels of metalization. The height of a metal wire may be a function of the processing. Resistivity may be used to determine the resistance value for a wire. The resistivity may vary as a function of temperature with higher resistivities resulting as temperatures increase. In some embodiments, wires may be composed of multiple rectangles and each rectangle's resistance may be combined to provide parasitic resistance values for the wire. In some embodiments, all the resistances may be summed into a single parasitic resistance value while in other embodiments, a single wire may be defined by multiple resistances and these multiple resistances may be stored for later analysis. Resistances may be determined for other shapes such as polysilicon, diffusion, via, and other shapes and these other resistance values may be included in the parasitics. In some embodiments, wires may be composed of multiple types of conductors including metalization levels, vias, polysilicon, diffusion, and the like. Resistance values may be combined by summing into a single parasitic resistance value or the multiple resistances for these various shapes may be stored separately for analysis.

Capacitance may be determined between any two conductors. Capacitance may be determined between M0, M1, M2, M3, M4, M5, M6, and other levels of metalization, various via levels, diffusions, polysilicon, and the like. Capacitance values may be determined between adjacent structures at the same level wherein the same level may include M0, M1, M2, M3, M4, M5, M6, and other levels of metalization, various via levels, diffusions, polysilicon, and the like. The parasitic capacitance value is defined by the shape of the two conductors, the dimensions of the two conductors, and the spacing between the conductors. The capacitance value is further defined by the dielectric constant of the insulator between the two conductors. The shapes, dimensions, the spacing, and the dielectric constant are not a function of temperature. The shapes, dimensions, the spacing, and the dielectric constant may however be a function of processing. For example, the thickness of an insulator layer forming the spacing between two conductors can be a function of the processing encountered during fabrication of a semiconductor chip. When the thickness of the insulator is smaller, the capacitance value between the two conductors separated by the insulator is increased.

The flow 100 may include identifying a set of unique process and temperature combinations 122 for multi-corner analysis. Multi-corner analysis involves performing timing analysis, or other analysis useful in semiconductor design, at multiple points of interest. A corner may be considered as a specific process, temperature, and voltage. Example temperature values may be −15, 0, 25, 85, 100, 115, or some other temperature where these temperatures are given in degrees centigrade. Temperatures in Kelvin or Fahrenheit are also possible. Often, low, nominal, and high temperatures are considered during semiconductor analysis. Example process values include worst case, nominal, and best case. Example voltages are high Vdd, nominal, and low Vdd. Historically, parasitic extraction has often been performed at each of the possible corners. Instead, a unique set of process and temperature corners may be determined for parasitic extraction. For capacitance values, only best case, nominal, and worst case processing may be considered, by way of example. For resistance values, low temperature with best case processing may be considered as a corner. Likewise, high Vdd with worst case processing may be considered as a corner. Likewise, nominal Vdd and nominal processing may be considered as a corner. This set of corners may make up the unique set of corners for multi-corner analysis. In some embodiments, five corners, nine corners, or some other number of corners may be used for analysis. From these corners a unique set of process and temperature corners may be determined for parasitic resistance extraction and a unique set of process corners may be determined for parasitic capacitance extraction. Thus, the extracting of parasitics 120 may be accomplished for the set of unique process and temperature combinations. More detail about extracting parasitics 120 is provided in the detailed description of FIG. 2 below.

The flow 100 continues with storing the parasitics 130 for the layout in an array. In some embodiments, there is a separate array for capacitance values and another array for resistance values. Values for the parasitics for the multiple corners for a single component may comprise a single element within the array. In some embodiments, the single component is a resistance along a wire. In other embodiments, the single component is a capacitance between two wires. In embodiments, the flow 100 may include generating a schematic 132 for a portion of the parasitics which were extracted. The schematic may show resistances along wires and capacitances between wires. The schematic may include transistors, logic gates, and other components of a semiconductor chip. In embodiments, the flow 100 may include analyzing the physical location 134 of the parasitics on a semiconductor chip. The layout for the semiconductor circuit may be displayed and the parasitics may be displayed as well. In embodiments, the flow 100 may include incorporating the parasitics which were extracted within a netlist 136 for a semiconductor chip. The netlist may be a hierarchical netlist or a flat netlist. A special netlist may be generated or the parasitics may be inserted in a netlist that already exists.

The flow 100 may include performing incremental extraction 140 by analyzing the layout to identify updates to the layout. A change in the design may cause a change in the layout. A change in the design may be necessitated by a change in specification, by a portion of the design not meeting a specification requirement, by a design optimization, re-synthesis of logic, changes in cells within a design, and so on. Design modifications can cause a change in the parasitic values. A full parasitic extraction can be performed, or an incremental extraction may be performed, by analyzing those differences made and the impact on parasitics. More detail about performing incremental extraction 140 is provided in the detailed description of FIG. 3 below.

The flow 100 continues with performing multi-corner analysis 150 using the parasitics stored in the array. The multiple corners wherein multi-corner analysis is performed may include two or more process, temperature, or voltage corners. The multi-corner analysis may optimize timing or other design parameters in order to simultaneously analyze multiple corners. By performing multi-corner analysis, iterative modifications which would prevent the design from reaching an overall optimum point can be avoided. The flow 100 may continue with performing timing analysis 160 during the multi-corner analysis. The timing analysis may improve delay, cycle time, setup time, hold time, and the like. The flow 100 may continue with performing timing closure 170 using the timing analysis which was performed. The timing closure may include modifying a circuit design so that timing requirements are met.

Figure 2:
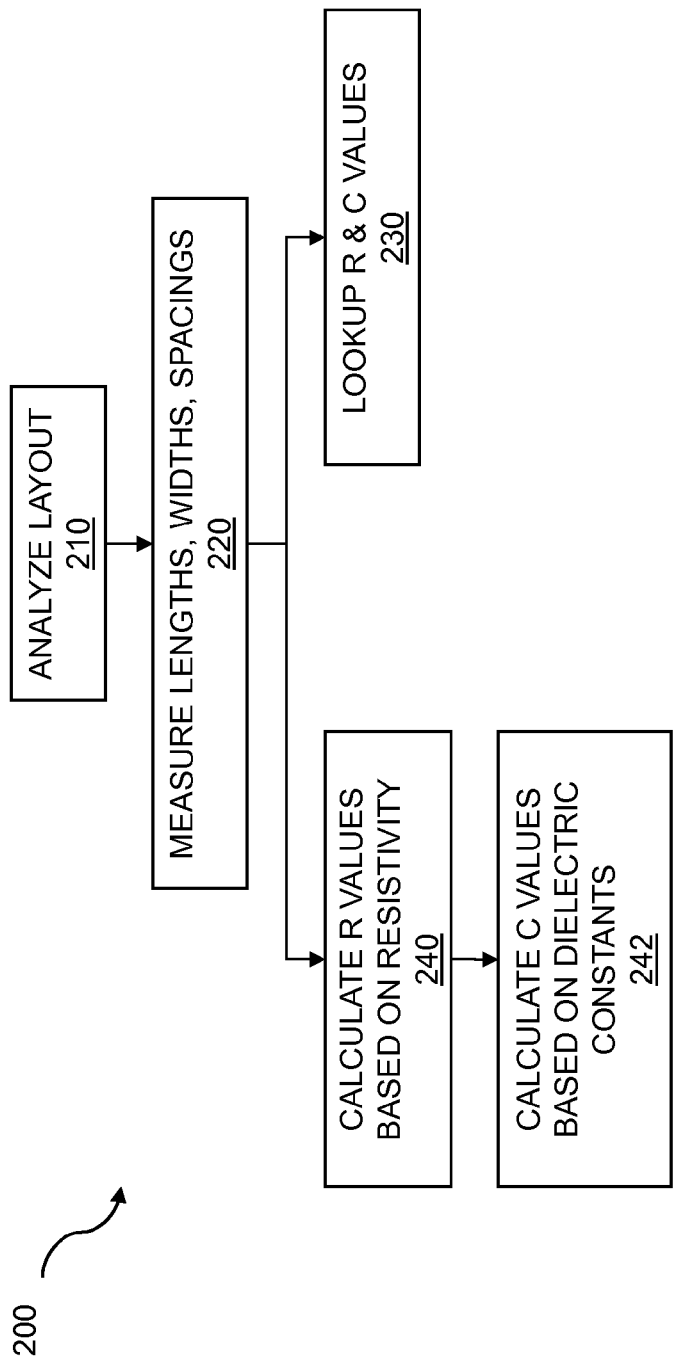
FIG. 2 is a flow diagram for extraction.

FIG. 2 is a flow diagram for extraction. A flow 200 is described for a computer-implemented method for performing parasitic extraction. The flow 200 includes analyzing the semiconductor layout 210. This semiconductor layout may have been imported, may have been implemented by an EDA tool, or may reside in computer memory during the semiconductor design process. The layout may be analyzed in a single pass for multiple process and/or temperature corners. The single pass may comprise measuring lengths, widths, and spacings 220 for geometric shapes within the layout once. The extracting may include scan line analysis. The scan line analysis may be used as part of the effort to calculate coupling between nets. In embodiments, the extracting may include tile-based analysis. The extracting may include analysis for one or more of via etch and double etch tables.

The extracting may further comprise performing a table lookup for parasitic values based on the geometric widths, lengths, and spacings wherein the parasitic values may be resistance and capacitance values 230. The table lookup may be repeated for each corner of interest from the multiple corners. In other embodiments, the resistance values may be directly calculated based on the resistivity 240 for the respective shape. Likewise the capacitance values may be calculated based on the dielectric constant 242 for the insulator between two conductors.

Figure 3:
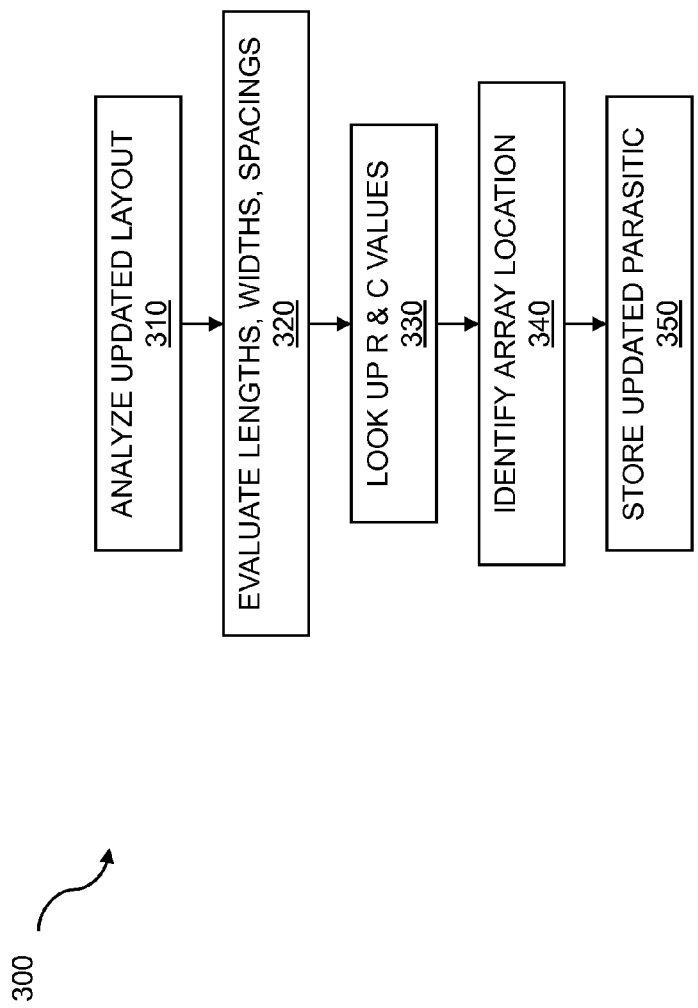
FIG. 3 is a flow diagram for incremental extraction.

FIG. 3 is a flow diagram for incremental extraction. A flow 300 describes a computer-implemented method for performing incremental parasitic extraction on an updated layout. The flow 300 includes analyzing the semiconductor layout. This semiconductor layout may have been imported, may have been implemented by an EDA tool, or may reside in computer memory during the semiconductor design process. The layout may be analyzed to identify updates to the layout 310. In embodiments, the layout is analyzed in a single pass for multiple process and/or temperature corners. The layout may be analyzed for changes to evaluate lengths, widths, and spacings 320 within the layout. The flow 300 continues with performing table look ups of resistance and capacitance values 330 based on the lengths, widths, and spacings which were changed. The flow 300 continues with identifying a location in the array 340 which corresponds to one of the updates to the layout. The flow 300 continues with storing updated parasitic values 350 for one of the resistance and the capacitance values in the array at the location which corresponds to one of the updates in the layout.

Figure 4:
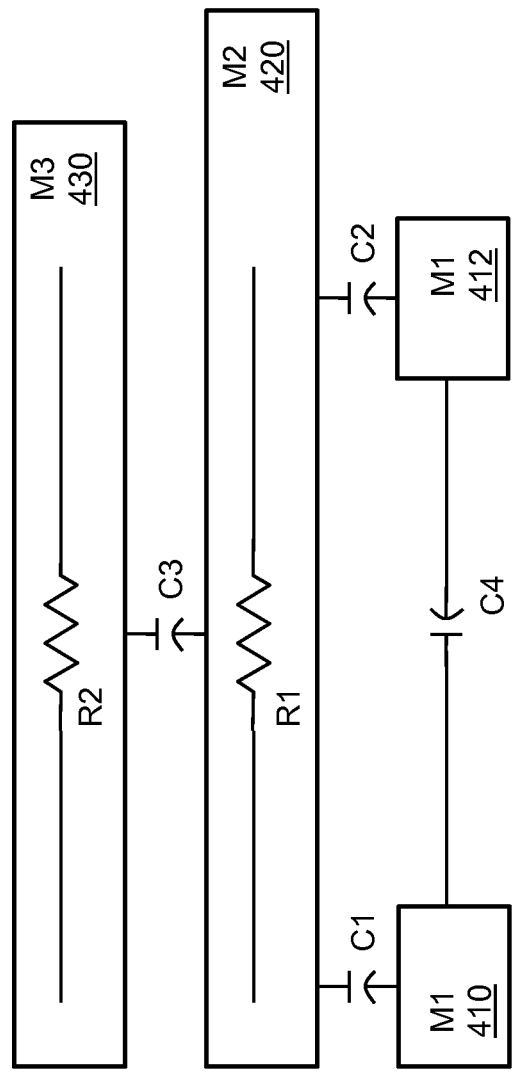
FIG. 4 is a diagram of metallization layers.

FIG. 4 is a diagram of metallization layers. Example metal one shapes are shown including a first metal one shape 410 and a second metal one shape 412. An example metal two shape 420 is shown along with an example metal three shape 430. The first metal one shape 410 and the second metal one shape 412 are representative of wires directed out of the plane of the figure and therefore no parasitic resistance is shown although it exists. The example metal two shape 420 has a parasitic resistance R1. The example metal three shape 430 has a parasitic resistance of R2. A parasitic capacitance C1 exists between the first metal one shape 410 and the metal two shape 420. A parasitic capacitance C2 exists between the second metal one shape 412 and the metal two shape 420. A parasitic capacitance C3 exists between the metal two shape 420 and the metal three shape 430. A parasitic capacitance C4 exists between the first metal one shape 410 and the second metal one shape 412. Each of these parasitic values may be extracted as part of a parasitic extraction effort. Numerous other resistances and capacitances may be extracted and these resistances and capacitances are only provided by way of example and not for limitation. Capacitances may be determined for nearest neighbors, next nearest neighbors, and so on. The extracting is performed by gathering the geometric widths, lengths, and spacings within the layout for these shapes. The parasitic values may be determined for multiple corners with a single pass through the semiconductor layout. The parasitic values may be stored in an array for use in timing analysis.

FIG. 5 shows example parasitic capacitance and resistance arrays. Parasitic extraction may be performed on layout. In embodiments, the parasitics which are extracted include resistance values wherein the resistance values are a function of the process and temperature. In embodiments, the parasitics which are extracted include capacitance values wherein the capacitance values are a function of the process. An example resistance array 510 is shown with resistive elements $R_1$, $R_2$, $R_3$, $R_4$, $R_5$, through $R_N$. Each element represents the resistance of a wire, conductor, or a portion thereof. An example capacitance array 520 is shown with capacitive elements $C_1$, $C_2$, $C_3$, through $C_M$. Each element represents the capacitance between two wires, conductors, or a combination thereof. In embodiments, a single element may be comprised of an element array. For example, the element $R_1$ may be comprised of an array 530. The element array may have a dimension based on a number of corners for which multi-corner analysis may be performed. The dimension may be based on a number of process corners. The dimension may be based on a number of temperature corners. The element array may be of a different dimension for a resistor element versus a capacitor element. For an example $R_1$, three example temperatures $T_1$, $T_2$, and $T_3$ as well as two example processes $P_1$ and $P_2$ are included. In another example, the element $C_1$ may be comprised of an array 540. In this example, two example process corners $P_1$ and $P_2$ are included. Each of these process or process and temperature corner parasitic values may be extracted and used in timing analysis.

FIG. 6 is a system diagram for parasitic extraction. The system 600 comprises one or more processors 610, an extractor module 630, a timing analyzer module 640, and a multi-corner analyzer module 650. In at least one embodiment, the extractor module 630, a timing analyzer module 640, and a multi-corner analyzer module 650 functions are accomplished by the one or more processors 610. The one or more processors 610 are coupled to a memory 612 which stores instructions, the overall design or a portion thereof, system support data, intermediate data, analysis, help information, and the like. In embodiments, the one or more processors 610 are coupled to an electronic display 614. The electronic display 614 may be any electronic display, including but not limited to, a computer display, a laptop screen, a net-book screen, a tablet computer screen, a cell phone display, a mobile device display, a remote with a display, a television, a projector, or the like.

The system 600 may import information on the layout 620. The layout 620 can be in the form of GDSII or OASIS™ or some other format for describing various shapes, sizes, and relationships of elements in a semiconductor layout. The layout may be for a semiconductor chip or die or portion thereof. The extractor module 630 may extract parasitics on the layout 620. The timing analyzer 640 may perform timing analysis on the design, given the parasitics which were extracted. The resulting timing analysis, layout, netlists, schematics, and the like may be shown on the display 614. The multi-corner analyzer module 650 may perform analysis on the design across a group of process, temperature, and voltage corners. The multi-corner analyzer 650 may perform multi-corner analysis including timing analysis, power analysis, and the like. The multi-corner analysis may be performed on multiple processors.

The system 600 may include computer program product embodied in a non-transitory computer-readable medium for design analysis. The computer program product may include code for importing a layout for a semiconductor circuit; code for extracting parasitics for the layout for multiple corners wherein the extracting is performed with a single pass of analyzing the layout; code for storing the parasitics for the layout in an array; and code for performing multi-corner analysis using the parasitics stored in the array.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer implemented method for performing extraction comprising:
   importing a layout for a semiconductor circuit;
   extracting parasitics for the layout for multiple corners wherein the extracting is performed with a single pass of analyzing the layout where the single pass of analyzing the layout includes measuring lengths, widths, and spacings for geometric shapes within the layout once;
   storing the parasitics for the layout in an array where values of the parasitics, for the multiple corners, for a single component comprise a single element within the array where the single element is comprised of an element array; and
   performing multi-corner analysis, using the parasitics stored in the array.

2. The method of claim 1 further comprising identifying a set of unique process and temperature combinations for the multi-corner analysis.

3. The method of claim 2 wherein the extracting parasitics is accomplished for the set of unique process and temperature combinations.

4. The method of claim 3 wherein the parasitics which are extracted include resistance values wherein the resistance values are a function of the process and temperature.

5. The method of claim 3 wherein the parasitics which are extracted include capacitance values wherein the capacitance values are a function of the process.

6. The method of claim 1 wherein the parasitics which are extracted include resistance values and capacitance values.

7. The method of claim 6 wherein the multiple corners include two or more process, temperature, or voltage corners.

8. The method of claim 1 wherein the element array has a dimension based on a number of corners for which the multi-corner analysis is performed.

9. The method of claim 8 wherein the dimension is based on a number of process corners.

10. The method of claim 8 wherein the dimension is based on a number of temperature corners.

11. The method of claim 8 wherein the element array is of a different dimension for a resistor element versus a capacitor element.

12. The method of claim 1 wherein the extracting is performed by gathering geometric widths, lengths, and spacings within the layout.

13. The method of claim 12 wherein the extracting further comprises performing a table lookup for parasitic values based on the geometric widths, lengths, and spacings.

14. The method of claim 13 wherein the table lookup is repeated for each corner of interest from the multiple corners.

15. The method of claim 1 further comprising performing incremental extraction by analyzing the layout to identify updates to the layout; evaluating changes to lengths, widths, and spacings within the layout; performing table look ups of resistance values and capacitance values based on the lengths, widths, and spacings which were changed; identifying a location in the array which corresponds to one of the updates to the layout; and storing updated parasitic values for one of the resistance values and the capacitance values in the array at the location which corresponds to one of the updates in the layout.

16. The method of claim 1 wherein the multi-corner analysis is performed on multiple processors.

17. The method of claim 1 further comprising performing timing analysis during the multi-corner analysis.

18. The method of claim 17 further comprising performing timing closure using the timing analysis which was performed.

19. The method of claim 1 wherein the extracting includes scanline analysis.

20. The method of claim 19 wherein the scanline analysis is used to calculate coupling between nets.

21. The method of claim 1 wherein the extracting includes tile-based analysis.

22. The method of claim 1 wherein the extracting includes analysis for one or more of via etch and double etch tables.

23. The method of claim 1 further comprising generating a schematic for a portion of the parasitics which were extracted.

24. The method of claim 1 further comprising analyzing physical location for the parasitics on a semiconductor chip.

25. The method of claim 1 further comprising incorporating the parasitics which were extracted within a netlist for a semiconductor chip.

26. A computer program product embodied in a non-transitory computer readable medium for performing extraction the computer program product comprising:
 code for importing a layout for a semiconductor circuit;
 code for extracting parasitics for the layout for multiple corners wherein the extracting is performed with a single pass of analyzing the layout where the single pass of analyzing the layout includes measuring lengths, widths, and spacings for geometric shapes within the layout once;
 code for storing the parasitics for the layout in an array where values of the parasitics, for the multiple corners, for a single component comprise a single element within the array where the single element is comprised of an element array; and
 code for performing multi-corner analysis using the parasitics stored in the array.

27. The computer program product of claim 26 further comprising code for identifying a set of unique process and temperature combinations for the multi-corner analysis.

28. The computer program product of claim 27 wherein the extracting parasitics is accomplished for the set of unique process and temperature combinations.

29. The computer program product of claim 26 wherein the multiple corners include two or more process, temperature, or voltage corners.

30. The computer program product of claim 26 wherein the element array has a dimension based on a number of corners for which the multi-corner analysis is performed.

31. A computer system for performing extraction comprising:
 a memory for storing instructions;
 one or more processors attached to the memory wherein the one or more processors are configured to:
  import a layout for a semiconductor circuit;
  extract parasitics for the layout for multiple corners wherein the extracting is performed with a single pass of analyzing the layout where the single pass of analyzing the layout includes measuring lengths, widths, and spacings for geometric shapes within the layout once;
  store the parasitics for the layout in an array where values of the parasitics, for the multiple corners, for a single component comprise a single element within the array where the single element is comprised of an element array; and
 perform multi-corner analysis using the parasitics stored in the array.

32. The system of claim 31 wherein the one or more processors are further configured to identify a set of unique process and temperature combinations for the multi-corner analysis.

33. The system of claim 32 wherein extraction of parasitics is accomplished for the set of unique process and temperature combinations.

34. The system of claim 31 wherein the multiple corners include two or more process, temperature, or voltage corners.

35. The system of claim 31 wherein the element array has a dimension based on a number of corners for which the multi-corner analysis is performed.

* * * * *